United States Patent Office 3,002,242
Patented Oct. 3, 1961

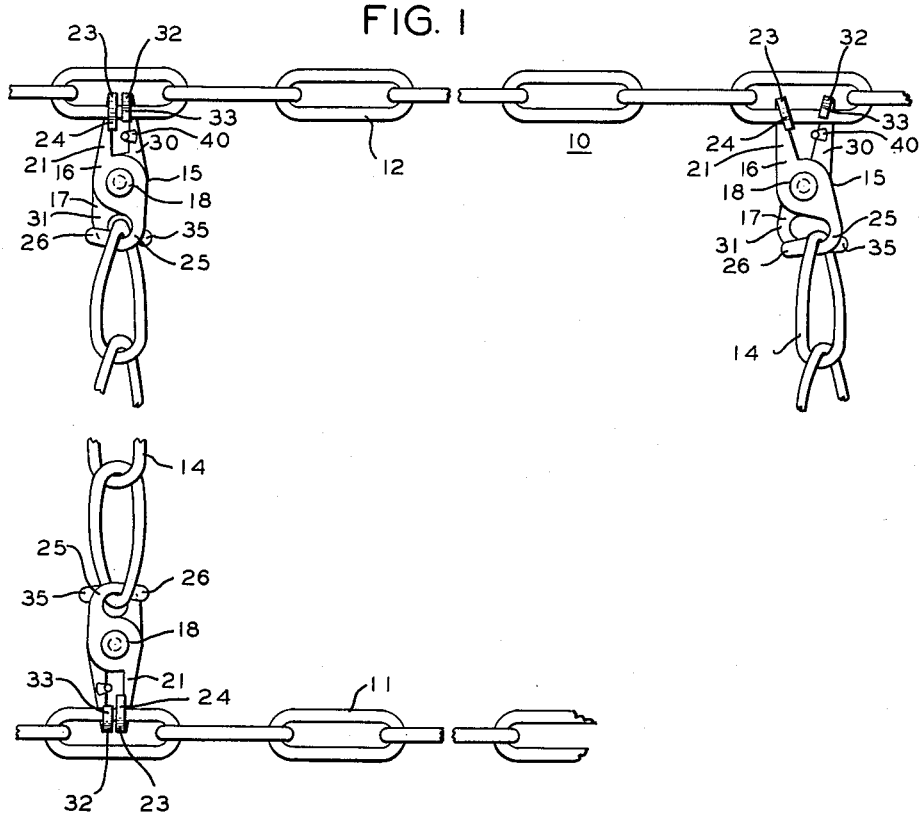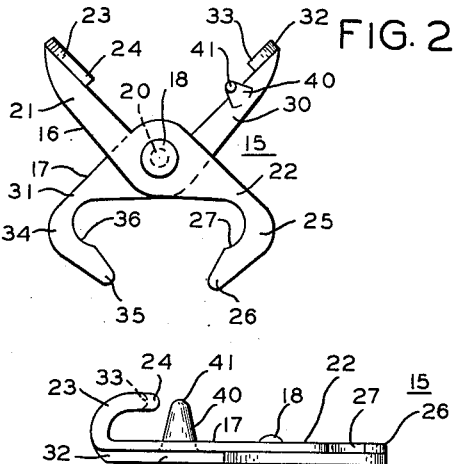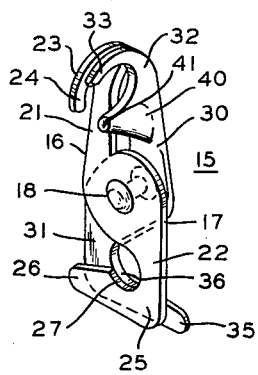

3,002,242
DETACHABLE CONNECTORS
John Shearman Donaldson, 48 Hedges Ave.,
Chatham, N.J.
Filed Mar. 4, 1960, Ser. No. 12,852
6 Claims. (Cl. 24—84)

It has heretofore been customary with tire skid chains to provide pairs of side chains with cross chains. Various structures have heretofore been proposed for connecting the cross chains at their ends to the side chains. When one of the links of the cross chains breaks, as frequently occurs in the use of the tire skid chains, difficulties are encountered with the structures now available in removing the broken cross chain and replacing the cross chain.

It is the principal object of the present invention to provide a connector which is particularly suitable for connecting the ends of cross chains of tire skid chains to side chains for easy and rapid repair.

It is a further object of the present invention to provide a connector of the character aforesaid which can be readily attached to the end of a cross chain and also can be readily attached to the side chains.

It is a further object of the present invention to provide a connector of the character aforesaid which is relatively easy to open for the purpose of making the desired connections, and which is held in closed position by the stresses effective thereon.

It is a further object of the present invention to provide a connector which is normally held in closed position, but which may be readily manipulated manually to open or close the same.

It is a further object of the present invention to provide a connector particularly adapted for engagement at its ends with chains and with which either end can be attached and detached without disengaging the other if desired.

It is a further object of the present invention to provide a connector having a small number of parts, two of which can be readily made as forgings or stampings, and of the desired degree of hardness.

It is a further object of the present invention to provide a connector which in use is free from likelihood of accidental separation.

It is a further object of the present invention to provide a connector which permits of a simplified construction initially and for purposes of repair of tire skid chains in that the desired length of chain for the cross chain can be cut in advance and as determined by the size of the tire with which it is to be employed, and made available in kit form.

It is a further object of the present invention to provide a connector which does not require any tools for its application and removal, but which when in position will be retained in position, but can at any time be readily removed by the user as desired.

It is a further object of the present invention to provide a connector which is so constructed that it is free from likelihood of injury in use to its components, and which will not injure or damage a tire casing with which it is used.

It is a further object of the present invention to provide a connector which is not limited for use with tire skid chains but which has a wide range of usefulness.

Other objects and advantageous features of the invention will be apparent from the description and claims.

The nature and characteristic features of the invention will be more readily understood from the following description, taken in connection with the accompanying drawings forming part thereof, in which:

FIGURE 1 is a fragmentary view of a portion of a tire skid chain having the connectors in accordance with the present invention employed therewith;

FIG. 2 is a plan view of one of the connectors in open position;

FIG. 3 is a side elevational view of one of the connectors; and

FIG. 4 is a perspective view of a connector in accordance with the present invention.

It should, of course, be understood that the description and drawings herein are illustrative merely, and that various modifications and changes can be made in the structure disclosed without departing from the spirit of the invention.

Referring now more particularly to the drawings, in which a preferred embodiment of the invention is illustrated, a portion of a tire skid chain is shown at 10 and includes side chains 11 and 12, which can be joined at their opposite ends in any desired manner, and a plurality of cross chains 14.

The cross chains 14 are shown as connected to the side chains 11 and 12 by connectors 15 in accordance with the present invention.

Each of the connectors 15 preferably includes a pair of arms 16 and 17, pivotally connected intermediate their ends in any desired manner, such as by a rivet 18, extending through holes 20 in the arms 16 and 17.

The arm 16 preferably has arm portions 21 and 22 extending in a plane normal to the pivotal axis provided by the rivet 18, and on opposite sides thereof. From the arm portion 21, a curved hook 23 extends, disposed in a plane normal to the main plane of the arm portions 21 and 22. The hook 23 is disposed along one margin of the arm portion 21 and has an end portion 24 extending along and in spaced relation to the arm portion 21.

The arm portion 22 of the arm 16 has a hook 25 extending therefrom, the hook 25 being disposed in the main plane of the arm portions 21 and 22 and having a projecting end 26 which extends outwardly for manual access for purposes to be explained.

The interior surface 27 of the hook 25 preferably extends to and beyond a central axial line extending longitudinally through the pivotal axis of the rivet hole 20 for purposes to be explained.

The arm 17 preferably has arm portions 30 and 31 extending in a plane normal to the pivotal axis provided by the rivet 18 and on opposite sides thereof. From the arm portion 30, a curved hook 32 extends, disposed in a plane normal to the main plane of the arm portions 30 and 31. The hook 32 is disposed along one margin of the arm portion 30 so as to abut against the hook 23 in closed position and has an end portion 33 in spaced relation to the arm portion 30. The hook 32 is not as large as the hook 23 so that the end portion 33 does not extend inwardly from the outer terminus to the same extent as the end portion 24.

The arm portion 31 of the arm 17 has a hook 34 extending therefrom, the hook 34 being disposed in the main plane of the arm portions 30 and 31 and having a projecting end 35 which extends outwardly for manual access for purposes to be explained.

The interior surface 36 of the hook 34 preferably extends to and beyond a central axial line extending longitudinally through the pivotal axis of the rivet hole 20 for purposes to be explained.

The arm portion 30 also has a projection 40 formed thereon and extending therefrom a distance to bring it beyond the inner margins of the hooks 23 and 32. The projection 40 has the outer terminus 41 thereof, in predetermined spaced relation to the terminal end 33 of the hook 32 and also is preferably disposed so that the end 24 of the hook 23 is in facing relation thereto, and with the terminus 41 sufficiently closely spaced with respect to the terminal end 24 to prevent the accidental removal or separation of a chain link through the limited space there provided.

The mode of use will now be pointed out.

Commencing with the connector 15 in closed condition as illustrated in FIG. 4, the fingers of the user are pressed against the ends 26 and 35 to separate the hooks 23 and 32 and to separate the hooks 24 and 34.

The initial connection is preferably made at the hooks 25 and 34 by engaging the end of a link of chain, such as one of the cross chains 14, over one of the hooks such as the hook 25.

The other hook 34 is brought toward a closing position but not completely closed.

With the hooks 23 and 32 separated and in the position shown at the upper right hand part of FIG. 2, a link of chain, such as the chain 10, is diagonally disposed so as to be inserted in the space between the hook 32 and the projection 40 and in engagement with hook 23. It will be noted that the hooks 32 and 23 must be separated to a sufficient extent to permit this insertion. The hooks 23 and 32 are then brought together either by manually urging them together, or by a force applied on the exteriors of the hooks 25 and 34, or by applying a force in tension on the chain 14 previously engaged with the hooks 24 and 34.

The engagement of a chain link with the surfaces 27 and 36 also tends to urge the connector 15 to closed condition.

When it is desired to separate the hooks 23 and 32 from a link with which they are in engagement, this can be readily accomplished by a reversal of the steps previously pointed out, the ends 26 and 35 of the hooks 25 and 34 facilitating the manual separation.

It will be noted that the hooks 25 and 34 can be disengaged from the end link of the cross chain 14 without removing the connector 15 from the side chain 10 and that the connector 15 can be disconnected from the side chain 10 without separation from the cross chain 14.

I claim:

1. A detachable connector comprising a pair of arms, a pivotal connection for said arms intermediate their ends, said arms having arm portions extending in opposite directions from the axis of the pivotal connection, the arm portions on one side of said connection having oppositely facing meeting hook portions, the arm portions at the opposite side of the said pivotal connection each having a hook extending outwardly therefrom on the same side thereof with its terminal end disposed toward the pivotal connection, said hooks being movable toward and away from each other upon pivotal movement of said arms, one of said hooks extending toward said pivotal connection to a greater extent than the other of said hooks and having an access opening thereinto along its arm, the other of said hooks having a projection extending from its arm portion in spaced relation to the terminal end thereof and in spaced relation to the terminal end of the other hook, said other hook having an access opening spaced from its arm and between the terminal end of the projection and its own terminal end, and said projection closing said first access opening when said hooks are together.

2. A detachable connector as defined in claim 1 in which the facing hook portions have end extensions each projecting beyond the opposite hook portion for manual separation of said arms.

3. A detachable connector as defined in claim 1 in which said hook portions have interior surfaces for urging said hook portions to closed positions.

4. A detachable connector comprising a pair of arms, a pivotal connection for said arms intermediate their ends, said arms having arm portions extending in planes normal to the axis of the pivotal connection, the arm portions on one side of said pivotal connection having oppositely facing meeting hook portions disposed in the respective planes of the arm portions, the arm portions at the opposite side of the said pivotal connection each having a hook extending out of the planes of the arm portions on the same sides thereof and in the same direction with its terminal end disposed toward the pivotal connection, said hooks being movable toward and away from each other upon pivotal movement of said arms, one of said hooks extending toward said pivotal connection to a greater extent than the other of said hooks and having an access opening thereinto along its arm, the other of said hooks having a projection extending from its arm portion in spaced relation to the terminal end thereof and in spaced relation to the terminal end of the other hook, said other hook having an access opening thereinto spaced from its arm and between the terminal end of the projection and its own terminal end, and said projection closing said first access opening when said hooks are together.

5. A detachable connector as defined in claim 4 in which the facing hook portions have end extensions each projecting beyond the opposite hook portion for manual separation of said arms.

6. A detachable connector as defined in claim 4 in which said hook portions have interior surfaces for urging said hook portions to closed positions.

References Cited in the file of this patent

UNITED STATES PATENTS

| 762,171 | Keene | June 7, 1904 |
| 931,588 | Forstner | Aug. 17, 1909 |
| 1,267,119 | Rosenberg | May 21, 1918 |
| 1,456,931 | Parker | May 29, 1923 |
| 1,512,914 | Du Rees | Oct. 28, 1924 |
| 1,584,307 | King | May 11, 1926 |
| 1,595,892 | Teeples | Aug. 10, 1926 |

FOREIGN PATENTS

| 84,124 | Switzerland | Feb. 16, 1920 |
| 247,728 | Great Britain | Feb. 25, 1926 |
| 532,154 | Great Britain | Jan. 17, 1941 |